United States Patent
Yoshitake

(10) Patent No.: US 11,655,367 B2
(45) Date of Patent: May 23, 2023

(54) ORGANOPOLYSILOXANE COMPOSITION

(71) Applicant: DOW TORAY CO., LTD., Tokyo (JP)

(72) Inventor: Makoto Yoshitake, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 442 days.

(21) Appl. No.: 16/761,505

(22) PCT Filed: Nov. 6, 2018

(86) PCT No.: PCT/JP2018/041097
§ 371 (c)(1),
(2) Date: May 5, 2020

(87) PCT Pub. No.: WO2019/093295
PCT Pub. Date: May 16, 2019

(65) Prior Publication Data
US 2021/0198489 A1    Jul. 1, 2021

(30) Foreign Application Priority Data

Nov. 7, 2017   (JP) .............................. JP2017-215135

(51) Int. Cl.
| | | |
|---|---|---|
| C08L 83/04 | (2006.01) |
| C09D 7/63 | (2018.01) |
| C09D 183/04 | (2006.01) |
| C09J 11/06 | (2006.01) |
| C09J 183/04 | (2006.01) |

(52) U.S. Cl.
CPC ............... *C08L 83/04* (2013.01); *C09D 7/63* (2018.01); *C09D 183/04* (2013.01); *C09J 11/06* (2013.01); *C09J 183/04* (2013.01)

(58) Field of Classification Search
CPC ..................................................... H01L 33/00
See application file for complete search history.

(56) References Cited

U.S. PATENT DOCUMENTS

| | | |
|---|---|---|
| 3,220,972 A | 11/1965 | Lamoreaux |
| 5,015,716 A | 5/1991 | Togashi et al. |
| 5,017,654 A | 5/1991 | Togashi et al. |
| 6,040,361 A | 3/2000 | Fujiki et al. |
| 2008/0051548 A1 * | 2/2008 | Bailey .................. C09D 183/04 528/31 |
| 2013/0072592 A1 | 3/2013 | Inafuku et al. |
| 2017/0261893 A1 | 9/2017 | Kinuta |
| 2021/0179784 A1 | 6/2021 | Yoshitake |

FOREIGN PATENT DOCUMENTS

| | | | |
|---|---|---|---|
| CN | 104098906 A | 10/2014 | |
| JP | H029448 A | 1/1990 | |
| JP | H0214244 A | 1/1990 | |
| JP | H0214244 A | 1/1990 | |
| JP | H029448 A | 1/1999 | |
| JP | H11236508 A | 8/1999 | |
| JP | 2012149240 A | 8/2012 | |
| JP | 2012149240 A | 8/2012 | |
| JP | 2017161779 A | 9/2017 | |
| JP | 2017161779 A | 9/2017 | |
| WO | WO 2007/047289 A1 * | 4/2007 | ............. H01L 33/00 |
| WO | 2012091167 A2 | 5/2012 | |
| WO | 2016160750 A1 | 10/2016 | |
| WO | 2017079502 A1 | 5/2017 | |

OTHER PUBLICATIONS

Machine assisted English translation of CN104098906A, obtained from https://patents.google.com/ on Dec. 11, 2021, 7 pages.
English translation of International Search Report for PCT/JP2018/041097 dated Feb. 12, 2019, 1 page.
Machine assisted English translation of JPH11236508A obtained from https://patents.google.com/patent on Jul. 28, 2020, 12 pages.

* cited by examiner

*Primary Examiner* — Khanh T Nguyen
(74) *Attorney, Agent, or Firm* — Warner Norcross + Judd LLP

(57) ABSTRACT

Provided is a hydrosilylation reactive composition and a method for producing a semi-cured product and a cured product using the hydrosilylation reactive composition, which exhibit sharp curability during the reaction while maintaining pot life and can provide a molecular design through the reaction control of the $M^H$ unit/$D^H$ unit. The composition comprises: (A) a compound containing at least one monovalent hydrocarbon group having an aliphatic unsaturated bond per molecule; (B) a compound containing at least two hydrogen atoms bonded to silicon atoms per molecule; (C) a first hydrosilylation catalyst; and (D) a second hydrosilylation catalyst which microencapsulates component (C) with a thermoplastic resin having a softening point within the temperature range of 50 to 200° C. and exhibits activity at temperatures higher than that of component (C). Also provided is a method for carrying out a hydrosilylation reaction at temperatures of two stages using the composition.

13 Claims, No Drawings

ORGANOPOLYSILOXANE COMPOSITION

CROSS-REFERENCE TO RELATED APPLICATIONS

This application is the National Stage of International Appl. No. PCT/JP2018/041097 filed on 6 Nov. 2018, which claims priority to and all advantages of Japanese Appl. No. 2017-215135 filed on 7 Nov. 2017, the content of which is hereby incorporated by reference.

TECHNICAL FIELD

The present invention relates to a composition which is cured by a hydrosilylation reaction, a method for producing a cured product cured by a hydrosilylation reaction, and a cured product and semi-cured product obtained by the method.

BACKGROUND ART

The hydrosilylation reaction is an addition reaction between a hydrosilyl group (—SiH) and an aliphatic unsaturated group and is widely used as an important means of synthesizing an organosilicon compound. In particular, in the reaction using an organopolysiloxane, the organopolysiloxane is crosslinked and used as an important reaction in preparing a silicone material. Although the reaction also occurs with light or heat, a radical reaction initiator such as peroxide or a transition metal complex catalyst such as hexachloroplatinum (IV) acid is generally used.

In preparing the silicone material, control of the crosslinking speed is important in terms of processability, workability, etc. Moreover, in order to obtain a material having the desired physical properties, the molecular weight and crosslinking density of the cured product must be appropriately designed. As a method for controlling the crosslinking speed, a method involving including and microencapsulating a catalyst with a thermoplastic resin, etc. is known (Patent Documents 1 and 2). Unfortunately, in the method of microencapsulating the catalyst, although the pot life (preservability) is high, the reaction proceeds instantaneously when heated, making it difficult to control the crosslinking speed itself.

In order to solve this problem, Patent Document 3 discloses a method in which, when curing the organopolysiloxane and the organohydrogenpolysiloxane in a hydrosilylation reaction, a platinum catalyst included with a thermoplastic resin, etc. is used in combination with a platinum catalyst not subjected to inclusion treatment, wherein the platinum catalyst not subjected to inclusion treatment is set to be 1/10 the weight or less of the platinum catalyst included with a resin and a reaction inhibitor is further used. Unfortunately, Patent Document 3 does not describe a method for optimizing the molecular weight and crosslinking density during a curing reaction.

In general, when curing by a hydrosilylation reaction using an organohydrogenpolysiloxane, the molecular structure of the organohydrogenpolysiloxane used causes large differences in the molecular weight and crosslinking density of the cured product. The organohydrogenpolysiloxane contains a hydrogen atom bonded to a silicon atom and has a partial structure referred to as an $M^H$ unit (—OSiR$_2$H) or a $D^H$ unit (—OSiRH—). The $M^H$ unit is mainly present at the terminus of a molecular chain of the organohydrogenpolysiloxane, with the molecular chain extended by the reaction of the $M^H$ unit. In contrast, the $D^H$ unit is present in the molecular chain of the organohydrogenpolysiloxane, with a crosslinking reaction carried out by reacting the $D^H$ unit. Unfortunately, in the current technology, it is difficult to carry out the reaction between the $M^H$ unit and the $D^H$ unit, with no molecular design due to the reaction control of the $M^H$ unit/$D^H$ unit carried out.

CITATION LIST

Patent Literature

[Patent Document 1] JP 2-9448 A
[Patent Document 2] JP 2-14244 A
[Patent Document 3] JP 11-236508 A

SUMMARY OF INVENTION

Technical Problem

Therefore, the object of the present invention is to provide a hydrosilylation reactive composition and a method for producing a cured product using the hydrosilylation reactive composition, which exhibit sharp curability during the reaction while maintaining pot life and can provide a molecular design through the reaction control of the $M^H$ unit/$D^H$ unit.

Solution to Problem

The composition according to the present invention is a composition containing the following components (A) to (D): (A) a compound containing at least one monovalent hydrocarbon group having an aliphatic unsaturated bond per molecule; (B) a compound containing at least two hydrogen atoms bonded to silicon atoms per molecule; (C) a first hydrosilylation catalyst; and (D) a second hydrosilylation catalyst which microencapsulates the compound described as component (C) with a thermoplastic resin having a softening point within the temperature range of 50 to 200° C. and exhibits activity at temperatures higher than that of component (C).

The temperature at which the activity of component (D) is exhibited is preferably at least 30° C. higher than the temperature at which the activity of component (C) is exhibited. Moreover, at least one of component (A) or (B) is preferably an organopolysiloxane.

Component (A) is preferably represented by the following average composition formula (1):

$$R^1_a R^2_b SiO_{(4-a-b)/2} \qquad (1)$$

(wherein, $R^1$ is an alkenyl group having 2 to 12 carbon atoms, $R^2$ is a group selected from the group consisting of a monovalent hydrocarbon group having 1 to 12 carbon atoms and no aliphatic unsaturated bond, a hydroxyl group, and an alkoxy group, and a and b are numbers satisfying the following conditions: $1 \leq a+b \leq 3$ and $0.001 \leq a/(a+b) \leq 0.33$.)

Component (B) is preferably represented by the following average unit formula (2):

$$H_c R^3_d SiO_{(4-c-d)/2} \qquad (2)$$

(wherein, $R^3$ is a group selected from the group consisting of a monovalent hydrocarbon group having 1 to 12 carbon atoms and no aliphatic unsaturated bond, a hydroxyl group, and an alkoxy group, and c and d are numbers satisfying the following conditions: $1 \leq c+d \leq 3$ and $0.01 \leq c/(c+d) \leq 0.33$.)

Further, component (B) is preferably represented by the following average unit formula (3):

$$(HR^4_2SiO_{1/2})_e (R^4_3SiO_{1/2})_f (HR^4SiO_{2/2})_g (R^4_2SiO_{2/2})_h \\ (HSiO_{3/2})_i (R^4SiO_{3/2})_j (SiO_{4/2})_k (R^5O_{1/2})_l \qquad (3)$$

(wherein, $R^4$ is a group selected from the group consisting of a monovalent hydrocarbon group having 1 to 12 carbon atoms and no aliphatic unsaturated group, a hydroxyl group, and an alkoxy group, $R^5$ is a hydrogen atom or an alkyl group having 1 to 6 carbon atoms, and e, f, g, h, i, j, k, and l are numbers satisfying the following conditions: $e+f+g+h+i+j+k=1$, $0 \le l \le 0.1$, $0.01 \le e+g+i \le 0.2$, $0.01 \le e \le 0.6$, $0.01 \le g \le 0.6$, $0 \le i \le 0.4$, $0.01 \le e+f \le 0.8$, $0.01 \le g+h \le 0.8$, $0 \le i+j \le 0.6$.)

The molar ratio ((C)/(D)) of components (C) to (D) is preferably 0.01 to 0.8, with component (C) preferably one or more selected from transition metal complex catalysts selected from platinum, palladium, rhodium, nickel, iridium, ruthenium, and iron complexes.

Moreover, a method for forming a cured product according to the present invention is a method including the following steps (i) and (ii): (i) heating the composition according to any one of Claims 1 to 7 at a temperature at which component (C) exhibits activity but component (D) does not exhibit activity and carrying out a first hydrosilylation reaction alone to obtain a semi-cured product; and (ii) heating the obtained semi-cured product at a temperature at which component (D) exhibits activity and carrying out a second hydrosilylation reaction to obtain a cured product.

Further, a semi-cured product according to the present invention is obtained by heating the composition at a temperature at which component (C) exhibits activity but component (D) does not exhibit activity and carrying out a first hydrosilylation reaction alone. The semi-cured product is preferably a thickened body having fluidity at room temperature or a thermoplastic body which is non-fluid at room temperature but exhibits fluidity at 100° C., the viscosity of the thickened body at 25° C. is 1.5 to 100-fold the initial viscosity of the composition, and the viscosity of the thermoplastic body at 100° C. is 1,000,000 mPa·s or less.

The present invention further relates to a cured product obtained by the method. The cured product is preferably a liquid silicon rubber, an adhesive, a thermally conductive elastomer, or a coating agent.

Advantageous Effects of Invention

The composition according to the present invention exhibits sharp curability during the reaction while maintaining good pot life and can provide a material design through the reaction control of the $M^H$ unit/$D^H$ unit. Further, according to the method of the present invention, a stable semi-cured state can be created without an organic solvent by reacting the $D^H$ unit after the $M^H$ unit has been previously reacted in order to extend the molecular chain. Therefore, because the material has excellent moldability and a curing reaction can be carried out by crosslinking after sufficiently increasing the molecular weight, the physical properties of the obtained material (cured product) can be improved.

MODE FOR CARRYING OUT THE INVENTION (Composition)
The composition according to the present invention contains the following components (A) to (D). The following is a sequential description.
Component (A)
The composition according to the present invention contains a compound (component (A)) containing at least one monovalent hydrocarbon group having an aliphatic unsaturated bond per molecule. Component (A) is a compound containing an aliphatic unsaturated hydrocarbon group to which a hydrosilylation group (—SiH) is added upon a hydrosilylation reaction. Exemplary components (A) include alkenyl group-containing linear or branched organopolysiloxanes, alkenyl group-containing polyethers, alkenyl group-containing polyolefins, and alkenyl group-containing polyesters. Among these, an organopolysiloxane having the following average composition formula (1) is preferable.

$$R^1_a R^2_b SiO_{(4-a-b)/2} \tag{1}$$

In the average composition formula, $R^1$ is an alkenyl group having 2 to 12 carbon atoms. Specific examples thereof include vinyl groups, allyl groups, butenyl groups, pentenyl groups, hexenyl groups, heptenyl groups, octenyl groups, nonenyl groups, decenyl groups, undecenyl groups, and dodecenyl groups, with vinyl groups, allyl groups, and hexenyl groups preferable. $R^2$ is a group selected from the group consisting of a monovalent hydrocarbon group having 1 to 12 carbon atoms and no aliphatic unsaturated bond, a hydroxyl group, and an alkoxy group. A portion of the hydrogen atom of the monovalent hydrocarbon group having 1 to 12 carbon atoms may be substituted with halogen atoms or a hydroxyl group. Exemplary monovalent hydrocarbon groups having 1 to 12 carbon atoms include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, and pyrenyl groups; aralkyl groups such as benzyl groups, phenethyl groups, naphthyl ethyl group, naphthyl propyl groups, anthracenyl ethyl groups, phenanthryl ethyl groups, and pyrenyl ethyl groups; and groups obtained by substituting hydrogen atoms of these aryl groups or aralkyl groups with alkyl groups (such as methyl groups and ethyl groups), alkoxy groups (such as methoxy groups and ethoxy groups), or halogen atoms (such as chlorine atoms and bromine atoms).

a and b are numbers satisfying the following conditions: $1 \le a+b \le 3$ and $0.001 \le a/(a+b) \le 0.33$. This is because the flexibility of the cured product increases when a+b is 1 or more, while the mechanical strength of the cured product increases when a+b is 3 or less. Moreover, this is because the mechanical strength of the cured product increases when a/(a+b) is 0.001 or more, while the flexibility of the cured product increases when a/(a+b) is 0.33 or less.

Exemplary molecular structures of such an organopolysiloxane include linear, branched, or cyclic structures. The organopolysiloxane may be one compound or a mixture of two or more compounds having such a molecular structure.

Such component (A) is preferably a linear organopolysiloxane represented by the general formula:

$$R^6_3SiO(R^6_2SiO)_{m1}SiR^6_3$$

and/or a branched organopolysiloxane represented by the average unit formula:

$$(R^7SiO_{3/2})_o(R^7_2SiO_{2/2})_p(R^7_3SiO_{1/2})_q(SiO_{4/2})_r(XO_{1/2})_s$$

In the formula, $R^6$ and $R^7$ are unsubstituted or halogen-substituted monovalent hydrocarbon groups, with examples thereof including the same groups as those described above. Note that at least two $R^6$ or at least two $R^7$ are alkenyl groups. As this alkenyl group, a vinyl group is preferable. Moreover, in the formula, m1 is an integer within the range of 5 to 1,000. Moreover, in the formula, o is a positive integer, p is 0 or a positive integer, q is 0 or a positive integer, r is 0 or a positive integer, s is 0 or a positive integer, p/o is a number within the range of 0 to 10, q/o is a number within the range of 0 to 5, r/(o+p+q+r) is a number within the range of 0 to 0.3, and s/(o+p+q+r) is a number within the range of 0 to 0.4.

Component (B)

The composition according to the present invention contains a compound containing at least two hydrogen atoms bonded to silicon atoms per molecule (component (B)). Component (B) is a compound containing a hydrosilylation group (—SiH) which, upon a hydrosilylation reaction, is added to a monovalent hydrocarbon group having an aliphatic unsaturated bond in component (A). Component (B) is preferably an organopolysiloxane having the following average composition formula (2).

$$H_c R^3_d SiO_{(4-c-d)/2} \quad (2)$$

In the average composition formula (2), $R^3$ is a group selected from the group consisting of a monovalent hydrocarbon group having 1 to 12 carbon atoms and no aliphatic unsaturated bond, a hydroxyl group, and an alkoxy group. A portion of the hydrogen atom of the monovalent hydrocarbon group having 1 to 12 carbon atoms may be substituted with halogen atoms or a hydroxyl group. Exemplary monovalent hydrocarbon groups having 1 to 12 carbon atoms include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, and pyrenyl groups; aralkyl groups such as benzyl groups, phenethyl groups, naphthyl ethyl group, naphthyl propyl groups, anthracenyl ethyl groups, phenanthryl ethyl groups, and pyrenyl ethyl groups; and groups obtained by substituting hydrogen atoms of these aryl groups or aralkyl groups with alkyl groups (such as methyl groups and ethyl groups), alkoxy groups (such as methoxy groups and ethoxy groups), or halogen atoms (such as chlorine atoms and bromine atoms). Exemplary alkoxy groups include methoxy groups, ethoxy groups, propoxy groups, butoxy groups, pentanoxy groups, hexanoxy groups, and otatanoxy groups. c and d are numbers satisfying the following conditions: 1≤c+d 3 and 0.01≤c/(c+d)≤0.33, and are preferably numbers satisfying the following conditions: 1.5 s c+d s 2.5 and 0.05≤c/(c+d) 0.2. This is because the flexibility of the cured product increases when c+d is 1 or more, while the mechanical strength of the cured product increases when c+d is 3 or less. Moreover, this is because the mechanical strength of the cured product increases when c/(c+d) is 1.5 or more, while the flexibility of the cured product increases when c/(c+d) is 0.33 or less.

While not limited thereto, the viscosity of the organopolysiloxane having the average composition formula (2) at 25° C. is preferably within the range of 1 to 10,000 mPa·s, particularly preferably within the range of 1 to 1,000 mPa·s.

Exemplary organopolysiloxanes having the average composition formula (2) include 1,1,3-3-tetramethyl disiloxanes, 1,3,5,7-tetramethyl cyclotetrasiloxanes, tris(dimethyl hydrogensiloxy)methylsilanes, tris(dimethyl hydrogensiloxy)phenylsilanes, 1-(3-glycidoxypropyl)-1,3,5,7-tetramethyl cyclotetrasiloxanes, 1,5-di(3-glycidoxypropyl)-1,3,5,7-tetramethyl cyclotetrasiloxanes, 1-(3-glycidoxypropyl)-5-trimethoxysilyl ethyl-1,3,5,7-tetramethyl cyclotetrasiloxanes, methyl hydrogen polysiloxanes blocked with a trimethylsiloxy on both terminals of a molecular chain, dimethyl siloxane/methyl hydrogen siloxane copolymers blocked with a trimethylsiloxy group on both terminals of a molecular chain, dimethyl polysiloxanes blocked with a dimethyl hydrogensiloxy group on both terminals of a molecular chain, dimethyl siloxane/methyl hydrogen siloxane copolymers blocked with a dimethyl hydrogensiloxy group on both terminals of a molecular chain, methyl hydrogen siloxane/diphenyl siloxane copolymers blocked with a trimethyl siloxane group on both terminals of a molecular chain, methyl hydrogen siloxane/diphenyl siloxane/dimethyl siloxane copolymers blocked with a trimethylsiloxy group on both terminals of a molecular chain, hydrolysis condensates of trimethoxysilane, copolymers containing $(CH_3)_2HSiO_{1/2}$ units and $SiO_{4/2}$ units, copolymers containing $(CH_3)_2HSiO_{1/2}$ units, $SiO_{4/2}$ units, and $(C_6H_5)SiO_{3/2}$ units, and mixtures of two or more types thereof.

Exemplary organopolysiloxanes having the average composition formula (2) further include the following organopolysiloxanes. Note that in the formulas, Me and Ph respectively represent a methyl group and a phenyl group, m2 is an integer of 1 to 100, n2 is an integer of 1 to 50, and b2, c2, d2, and e2 are each positive numbers, wherein the sum of b2, c2, d2, and e2 per molecule is 1.

$HMe_2SiO(Ph_2SiO)_{m2}SiMe_2H$ $HMePhSiO(Ph_2SiO)_{m2}SiMePhH$ $HMePhSiO(Ph_2SiO)_{m2}(MePhSiO)_{n2}SiMePhH$ $HMePhSiO(Ph_2SiO)_{m2}(Me_2SiO)_{n2}SiMePhH$ $(HMe_2SiO_{1/2})_{b2}(PhSiO_{3/2})_{c2}$ $(HMePhSiO_{1/2})_{b2}(PhSiO_{3/2})_{c2}$ $(HMePhSiO_{1/2})_{b2}(HMe_2SiO_{1/2})_{c2}(PhSiO_{3/2})_{d2}$ $(HMe_2SiO_{1/2})_{b2}(Ph_2SiO_{2/2})_{c2}(PhSiO_{3/2})_{d2}$ $(HMePhSiO_{1/2})_{b2}(Ph_2SiO_{2/2})_{c2}(PhSiO_{3/2})_{d2}$ $(HMePhSiO_{1/2})_{b2}(HMe_2SiO_{1/2})_{c2}(Ph_2SiO_{2/2})_{d2}(PhSiO_{3/2})_{e2}$

Component (B) is further preferably an organohydrogenpolysiloxane represented by the following average unit formula (3).

$$(HR^4_2SiO_{1/2})_e(R^4_3SiO_{1/2})_f(HR^4SiO_{2/2})_g(R^4_2SiO_{2/2})_h \\ (HSiO_{3/2})_i(R^4SiO_{3/2})_j(SiO_{4/2})_k(R^5O_{1/2})_l \quad (3)$$

In the average unit formula (3), $R^4$ is a group selected from the group consisting of a monovalent hydrocarbon group having 1 to 12 carbon atoms and no aliphatic unsaturated bond, a hydroxyl group, and an alkoxy group. The monovalent hydrocarbon group having 1 to 12 carbon atoms, the hydroxyl group, and the alkoxy group are the same as described above. $R^5$ is a hydrogen atom or an alkyl group having 1 to 6 carbon atoms, with examples of the alkyl group having 1 to 6 carbon atoms including a methyl group, ethyl group, propyl group, butyl group, and hexyl group. e, f, g, h, i, j, k, and l are numbers satisfying the following conditions: e+f+g+h+i+j+k=1, 0≤l≤0.1, 0.01≤e+g+i≤0.2, 0.01≤e≤0.6, 0.01≤g 0.6, 0≤i 0.4, 0.01≤e+f≤0.8, 0.01≤g+h≤0.8, 0≤i+j≤0.6.

Note that each constituent unit of "$HR^4_2SiO_{1/2}$," "$R^4_3SiO_{1/2}$," "$HR^4SiO_{2/2}$," "$R^42SiO_{2/2}$," "$HSiO_{3/2}$," "$R^4SiO_{3/2}$," and "$SiO_{4/2}$" are respectively units of the partial structures of organohydrogenpolysiloxanes referred to as an $M^H$ unit, M unit, $D^H$ unit, D unit, TH unit, T unit, and Q unit, while "$R^5O_{1/2}$" is a group bonded to an oxygen atom in a D unit, $D^H$ unit, T unit, $T^H$ unit, or Q unit, and means a silicon atom-bonded hydroxyl group (Si—OH) in the organopolysiloxane, or a silicon atom-bonded alkoxy group which remains unreacted during the production of the organopolysiloxane. The $M^H$ unit is mainly present at the terminus of a molecular chain of the organohydrogenpolysiloxane, while the DH unit is present in the molecular chain of the organohydrogenpolysiloxane.

The content of component (B) is an amount in which the silicon atom-bonded hydrogen atoms in the present component are within the range of 0.1 to 5 mols, preferably an amount within the range of 0.5 to 2 mols, with regard to a total of 1 mol of monovalent hydrocarbon groups having an aliphatic unsaturated bond in component (A). This is because the mechanical strength of a cured product increases when the content of component (B) is the lower limit of the abovementioned range or more, while the flexibility of the cured product increases when it is the upper limit of the abovementioned range or less.

Component (C)

The composition according to the present invention contains a first hydrosilylation catalyst (component (C)) which exhibits activity in the composition at a relatively low temperature. Component (C) is a hydrosilylation reaction catalyst for semi-curing the present composition. Note that "semi-cured" refers to a thickened body having fluidity at room temperature or a thermoplastic body which is non-fluid at room temperature but exhibits fluidity at 100° C. Here, "thickened body" means that the viscosity at 25° C. is 1.5 to 100-fold the initial viscosity of the composition. Moreover, "thermoplastic body" means that the viscosity at 100° C. is 1,000,000 mPa·s or less.

Exemplary first hydrosilylation catalysts include platinum based catalysts, rhodium based catalysts, palladium based catalysts, nickel based catalysts, iridium based catalysts, ruthenium based catalysts, and iron based catalysts, with platinum based catalysts preferable. Examples of the platinum based catalyst include platinum based compounds, such as platinum fine powder, platinum black, platinum-supporting silica fine powder, platinum-supporting activated carbon, chloroplatinic acid, alcohol solutions of chloroplatinic acid, olefin complexes of platinum, and alkenylsiloxane complexes of platinum, with alkenylsiloxane complexes of platinum particularly preferable. Examples of this alkenyl siloxane include: 1,3-divinyl-1,1,3,3-tetramethyldisiloxane; 1,3,5,7-tetramethyl-1,3,5,7-tetravinylcyclotetrasiloxane; an alkenyl siloxane obtained by substituting part of methyl groups of these alkenyl siloxanes with an ethyl group, a phenyl group, etc.; and an alkenyl siloxane obtained by substituting part of vinyl groups of these alkenyl siloxanes with an allyl group, a hexenyl group, etc. In particular, 1,3-divinyl-1,1,3,3-tetramethyldisiloxane is preferable because the platinum-alkenyl siloxane complex has good stability. Moreover, because the stability of the platinum-alkenylsiloxane complex can be improved, alkenylsiloxanes (such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane) and organosiloxane oligomers (such as dimethylsiloxane oligomers) are preferably added, particularly preferably alkenylsiloxanes, to this complex.

The catalyst of component (D) is a so-called non-microencapsulated catalyst different from the catalyst of component (D). Therefore, while varying depending on the amount and type of the catalyst, as well as the type of composition, the catalyst typically exhibits activity at room temperature or more, 25° C. or more, or 30° C. or more, and 120° C. or less, or 100° C. or less, or 80° C. or less, and in some cases 60° C. or less, to promote the hydrosilylation reaction. The content of component (C) varies depending on the type of catalyst and the type of composition, but is typically an amount in which metal atoms in this catalyst are within the range of 0.01 to 50 ppm, preferably within the range of 0.1 to 30 ppm, with regard to the present composition. As an example, when component (B) is an organohydrogenpolysiloxane represented by the average composition formula (3), the content of component (C) is an amount capable of sufficiently hydrosilylating the MH unit in the organohydrogenpolysiloxane.

Component (D)

The composition according to the present invention is obtained by microencapsulating the compound described as component (C) with a thermoplastic resin having a softening point within the temperature range of 50 to 200° C., wherein the composition contains a second hydrosilylation catalyst (component (D)) which does not exhibit activity at the temperature at which component (C) exhibits activity, but rather exhibits activity in the composition at temperatures higher than the temperature. Preferably, component (D) exhibits activity at a temperature which is at least 20° C. higher than the temperature at which component (C) exhibits activity, or at a temperature which is at least 30° C. higher than the temperature at which component (C) exhibits activity, or in some cases, at a temperature which is at least 50° C. higher than the temperature at which component (C) exhibits activity. The softening point of the thermoplastic resin is preferably 80° C. or more and 160° C. or less. Exemplary thermoplastic resins include polyolefin resins, polystyrene resins, acrylic resins, cellulose resins, thermoplastic silicone resins, polycarbonate resins, etc. The microencapsulated hydrosilylation catalyst is described in Patent Documents 1 and 2, and can be prepared by the method described therein.

Component (D) exhibits catalytic activity at or above the vicinity of the melting point of the thermoplastic resin used for microencapsulation. Thus, the temperature at which catalytic activity is exhibited varies depending on the type of thermoplastic resin, but is typically 80° C. or more, preferably 100° C. or more, and further preferably 120° C. or more.

The content of component (D) is the amount needed to further cure the composition semi-cured by component (C) and is preferably an amount in which metal atoms in the catalyst are within the range of 1 to 50 ppm, preferably within the range from 5 to 30 ppm, with regard to the present composition. As an example, when component (B) is an organohydrogenpolysiloxane represented by the general formula (3), the content of component (D) is an amount capable of sufficiently hydrosilylating the $D^H$ unit in the organohydrogenpolysiloxane.

The molar ratio ((C)/(D)) of the amount of platinum metal in components (C) and (D) is typically from 0.01 to 100, preferably from 0.01 to 10, and further preferably from 0.01 to 0.8. This is because the curing reaction can be accelerated at high temperatures when the molar ratio is the abovementioned upper limit or less, while the curing reaction can be carried out at low temperatures in a short period of time when the molar ratio is the abovementioned lower limit or more.

The composition preferably does not contain a hydrosilylation reaction inhibitor. Typically, a hydrosilylation reaction inhibitor is added into the composition in order to improve the pot life of the composition and obtain a stable composition. However, the present inventors have found that the reaction of the $M^H$ unit and the reaction of the $D^H$ unit can be separated using very small amounts of two or more catalysts having different catalytic activities depending on the temperature without the addition of a hydrosilylation reaction inhibitor, a semi-cured resin can be obtained by selectively reacting the $M^H$ unit, and the molecular design can be carried out by the reaction control of the $M^H$ unit/$D^H$ unit.

Component (E)

The present composition may contain other organopolysiloxanes, an adhesion imparting agent, an inorganic filler such as silica, glass, alumina, and zinc oxide, an organic resin fine powder such as a polymethacrylate resin, a phosphor, a heat resistant agent, a dye, a pigment, a flame retarder, a solvent, etc. An inorganic filler is added to increase the amount of the composition, reinforce the physical strength, or add functions such as conductivity and thermal conductivity.

(Method for Forming a Cured Product)

Another form of the present invention is a method for forming a cured product by a hydrosilylation reaction having the following steps of:

(i) heating the composition at a temperature at which component (C) exhibits activity but component (D) does not exhibit activity and carrying out a first hydrosilylation reaction alone to obtain a semi-cured product; and (ii) heating the obtained semi-cured product at a temperature at which component (D) exhibits activity and carrying out a second hydrosilylation reaction to obtain a cured product.

(Step (i))

Step (i) is a step involving heating the composition at a temperature at which component (C) exhibits activity but component (D) does not exhibit activity and carrying out a first hydrosilylation reaction alone to obtain a semi-cured product. No second hydrosilylation reaction occurs at this temperature. The first hydrosilylation proceeds even at room temperature without heating. However, in the event of a desire to increase the speed of semi-curing, the composition can be heated to a heating temperature of 25° C. or more, 30° C. or more, and in some cases, 50° C. or more. Moreover, the heating temperature is 120° C. or less, 100° C. or less, or in some cases 80° C. or less.

In step (i), the composition is in a semi-cured state. In the present invention, the semi-cured refers to a thickened body having fluidity at room temperature or a thermoplastic body which is non-fluid at room temperature but exhibits fluidity at 100° C. Here, "thickened body" means that the viscosity at 25° C. is 1.5 to 100-fold the initial viscosity of the composition. A "thermoplastic body (reactive hot melt)" refers to the state in which fluidity is lost at room temperature (25° C.), but when a composition is heated to a high temperature (for example, 120° C. or more), it is melted again, then cured, and the viscosity at 100° C. is 1,000,000 mPa·s or less. Moreover, the B-stage compound also can be obtained by step (i). Here, this "B-stage" refers to the state of the B-stage (a cured intermediate product of thermosetting resin) defined in JIS K 6800; wherein, when a crosslinkable silicone composition is incompletely cured, it swells due to a solvent, but is not completely dissolved. When a composition containing an organopolysiloxane containing a $M^H$ unit and a $D^H$ unit is used as the composition, the hydrosilylation reaction of the $M^H$ unit preferentially proceeds due to step (i), the molecular chain is extended, and the molecular weight of the organopolysiloxane is sufficiently high, such that the fluidity of the composition is lost and the composition becomes semi-cured.

(Step (ii))

Step (ii) is a step involving heating the composition in the semi-cured state to a temperature at which component (D) exhibits activity and carrying out a second hydrosilylation reaction to obtain a cured product. Preferably, the heating temperature of step (ii) is a temperature which is at least 20° C. higher than the temperature of step (i), or the heating temperature of step (ii) is a temperature which is at least 30° C. higher than the temperature of step (i), while further preferably, the heating temperature of step (ii) is at least 50° C. higher than the temperature of step (i).

Moreover, in some cases, the heating temperature is 80° C. or more, 100° C. or more, or 120° C. or more. At the same time, in some cases, the heating temperature is 200° C. or less, or 180° C. or less, or 160° C. or less.

The heating time depends on the type and formulation amount of each component in the composition, as well as the heating temperature, but is typically one minute to 10 hours, preferably five minutes to two hours.

According to step (ii), the composition in the semi-cured state serves as a cured product and can be used as various materials. When a composition containing an organopolysiloxane including the $M^H$ unit and the $D^H$ unit is used as the composition, the organopolysiloxane having a molecular chain sufficiently extended by step (i) can be crosslinked by the second hydrosilylation reaction so as to obtain a cured product having a high crosslinking density.

The cured product formed by the method according to the present invention exhibits excellent physical properties and, in particular, exhibits excellent mechanical strength. Moreover, the method according to the present invention can be used in various applications in order to obtain a cured product via a stable semi-cured state. For example, after the present composition has been applied to a film substrate, a tape shaped substrate, or the sheet shaped substrate, curing can be promoted via steps (i) and (ii). Moreover, there are cases in which the present composition is arranged between two substrates and cured by continuously carrying out steps (i) and (ii), with both substrates firmly bonded. There are also cases in which the present composition is smoothly applied to at least one surface of the substrate, semi-cured by step (i), then becomes non-fluid, after which both substrates are bonded together and the composition is further cured in step (ii) so as to firmly adhere both substrates. While not limited thereto, the film thickness of this cured product is preferably 1 to 100,000 μm, more preferably 50 to 30,000 μm.

The cured product formed by the method according to the present invention can be used in applications such as a liquid silicone rubber (LSR), an adhesive, a thermally conductive elastomer, or a coating agent.

EXAMPLES

A cured product was obtained from a composition containing the following components. Note that in each average composition formula, Me and Vi represent a methyl group and a vinyl group, respectively. Moreover, the hardness of the cured product was measured by a method in accordance with JIS K 6253-1997 "Hardness testing methods for rubber, vulcanized or thermoplastic" (hereinafter, referred to as "Shore hardness (Shore A))." Alternatively, the needle penetration of the cured product was measured by a method in accordance with JIS K 2220 [1/4 cone (direct read)].

Example 1

A composition was prepared containing 58.5 parts by weight of a vinyl-terminated branched polysiloxane (A-1) represented by the average unit formula: $(Me_2ViSiO_{1/2})_{0.1}$ $(Me_3SiO_{1/2})_{0.4}(SiO_{4/2})_{0.5}$, 14.0 parts by weight of a branched polysiloxane (E-1) represented by the average unit formula: $(Me_3SiO_{1/2})_{0.44}(SiO_{4/2})_{0.56}$, 1.8 parts by weight of a vinyl-terminated linear polysiloxane (A-2) represented by the average formula: $ViMe_2SiO(SiMe_2O)_{160}SiMe_2Vi$, 26.1 parts by weight of a linear polysiloxane (B-1) represented by the average formula: $HMe_2SiO(SiMe_2O)_{400}SiMe_2H$, 4.7 parts by weight of a linear polysiloxane (B-2) represented by the average formula: $Me_3SiO(SiMe_2O)_{30}(SiMeHO)_{30}SiMe_3$, 0.2 ppm of a platinum-1,3-divinyl-1,1,3,3-tetramethyldisiloxane complex (C-1) as platinum atoms, and 2 ppm of platinum-1,3-divinyl-1,1,3,3-tetramethyldisiloxane complex (D-1) as platinum atoms, which is dispersed in polycarbonate particles having an average particle diameter of two micrometers. The viscosity of the composition was 3,500 mPa·s. The composition was heated at 90° C. for 30 minutes to obtain a B-stage solid having no fluidity at 25° C. but having fluidity at 100° C. Despite the fact that the obtained B-stage solid was stored at 25° C. for two months, it maintained the B-stage state. The B-stage solid was heated at 150° C. for under 10 minutes to obtain a silicone elastomer having a Shore hardness (Shore A) of 80.

Example 2

A composition was prepared containing 33.8 parts by weight of A-1, 30.0 parts by weight of E-1, 21.8 parts by weight of A-2, 16.5 parts by weight of B-1, 3.0 parts by weight of B-2, 0.1 ppm of C-1 as platinum atoms, and 2 ppm of D-1 as platinum atoms. The viscosity of the composition was 2,800 mPa·s. The composition was heated at 90° C. for 30 minutes to obtain a B-stage solid having no fluidity at 25° C. but having fluidity at 100° C. Despite the fact that the obtained B-stage solid was stored at 25° C. for two months, it maintained the B-stage state. The B-stage solid was heated at 150° C. for under 10 minutes to obtain a silicone elastomer having a Shore hardness (Shore A) of 35.

Example 3

A composition containing 94.3 wt. % of a vinyl-terminated linear polysiloxane (A-3) represented by the average composition formula: $ViMe_2SiO(SiMePhO)_{36}SiMe_2Vi$, 1.0 wt. % of a vinyl group-containing polysiloxane (A-4) represented by the average composition formula: $(ViMe_2SiO_{1/2})_{0.22}(MeXSiO_{2/2})_{0.12}(PhSiO_{3/2})_{0.66}$ (wherein, X represents a glycidoxypropyl group), 3.9 wt. % of a linear polysiloxane (B-3) represented by the molecular formula $Ph_2Si(OSiMe_2H)_2$, 0.8 wt. % of a cyclic polysiloxane (B-4) represented by the average composition formula: $(HMeSiO_{2/2})_4$, 0.2 ppm of C-1 as platinum atoms, and 2 ppm of D-1 as platinum atoms was prepared. The viscosity of the composition was 6,000 mPa·s. The composition was heated at 80° C. for 30 minutes to obtain a thickened body having a viscosity of approximately 12,000 mPa·s. The obtained thickened body had fluidity with a thickened body of approximately 18,000 Pa·s after being stored at 25° C. for one month, while heating at 150° C. for under 10 minutes resulted in a gel cured product having a needle penetration of 30.

Comparative Example 1

A composition was prepared containing 58.5 parts by weight of A-1, 14.0 parts by weight of E-1, 1.8 parts by weight of A-2, 26.1 parts by weight of B-1, 4.7 parts by weight of B-2, and 2 ppm of C-1 as platinum atoms. The viscosity of the composition was 3,500 mPa·s. The composition was heated at 90° C. for 30 minutes to obtain a cured product having a Shore hardness (Shore A) of 80. Moreover, in order to obtain a softer cured product, the composition was heated at 50° C. for 30 minutes to obtain a cured product having a Shore hardness (Shore A) of 40. However, despite the fact that the obtained cured product was a soft product that did not exhibit fluidity even when heated to 100° C., it was not in the B-stage state. The cured product gradually increased hardness over time and had a Shore hardness (Shore A) of 75 at 25° C. after two weeks.

Comparative Example 2

A composition was prepared containing 33.8 parts by weight of A-1, 30.0 parts by weight of E-1, 21.8 parts by weight of A-2, 16.5 parts by weight of B-1, 3.0 parts by weight of B-2, and 2 ppm of D-1 as platinum atoms. The viscosity of the composition was 2,800 mPa·s. The composition was heated at 90° C. for 30 minutes, with no change observed therein. The composition was heated at 120° C. for 30 minutes to obtain a cured product having a Shore hardness (Shore A) of 30, which was not in the B-stage state.

Comparative Example 3

A composition was prepared containing 94.3 wt. % of A-3, 1.0 wt. % of A-4, 3.9 wt. % of B-3, 0.8 wt. % of B-4, and 2 ppm of C-1 as platinum atoms. The viscosity of the composition was 6,000 mPa·s. The composition was immediately thickened after preparation and was non-fluid after 30 minutes with no thickened body or B-stage solid obtained, resulting in a gel cured product with a needle penetration of 30 after one day.

INDUSTRIAL APPLICABILITY

The composition according to the present invention exhibits sharp curability during the reaction while maintaining good pot life and is therefore suitable as an adhesive or pressure sensitive adhesive between layers of the image display apparatus.

The present compositions are useful as various potting agents, sealants, adhesives, and pressure sensitive adhesives. In particular, curing via a semi-cured/thickened body (including a B-stage material) can advantageously suppress changes in volume associated with curing and contraction between the composition and the final cured product at the time of placement, suppressing problems of gaps and poor adhesion between members.

The present composition has excellent curability and sharp curability during the reaction while maintaining good pot life even when exposed to high temperatures and high humidity, making it useful as an adhesive or pressure sensitive adhesive used in display apparatuses (including touch panels) such as an optical display or an optical semiconductor apparatus (including Micro LEDs). Further, the present composition and the semi-cured product/thickened body thereof (including the B-stage material) are not limited to optical displays, etc. and can be utilized without limitation to the pasting or filling of the member, in addition to being capable of being used for an adhesive layer such as a solar battery cell, multilayer glass (smart glass), optical waveguide, and projector lens (multilayer lens, polarizing/optical film pasting). Moreover, the present composition has the general advantage of a silicone cured product which can suppress poor display such as defects (of displays and optical members) and image unevenness due to little curing and contraction when forming the final cured product from the semi-cured state, consequently suppressing problems caused by curing and contraction. Further, the cured product formed from the present composition has flexible properties as necessary and exhibits adhesive force having high trackability to the adhesive member, thereby effectively suppressing peeling between members and allowing it to be suitably used for optical adhesive layers such as an on-vehicle display having a planar display surface or a curved display surface, or a head-up display utilizing the abovementioned projector lens.

The invention claimed is:

1. A composition comprising:
   (A) a compound containing at least one monovalent hydrocarbon group having an aliphatic unsaturated bond per molecule;
   (B) a compound containing at least two hydrogen atoms bonded to silicon atoms per molecule;
   (C) a first hydrosilylation catalyst; and
   (D) a second hydrosilylation catalyst which microencapsulates component (C) with a thermoplastic resin having a softening point within the temperature range from 50 to 200° C. and exhibits activity at temperatures higher than that of component (C).

2. The composition according to claim 1, wherein the temperature at which the activity of component (D) is exhibited is at least 30° C. higher than the temperature at which the activity of component (C) is exhibited.

3. The composition according to claim 1, wherein at least one of components (A) and (B) is an organopolysiloxane.

4. The composition according to claim 1, wherein component (A) is represented by the following average composition formula (1):

wherein, $R^1$ is an alkenyl group having 2 to 12 carbon atoms, $R^2$ is a group selected from the group consisting of a monovalent hydrocarbon group having 1 to 12 carbon atoms and no aliphatic unsaturated bond, a hydroxyl group, and an alkoxy group, and subscripts a and b are numbers satisfying the following conditions: $1 \leq a+b \leq 3$ and $0.001 \leq a/(a+b) \leq 0.33$;
   and wherein component (B) is an organopolysiloxane represented by the following average composition formula (2):

wherein, $R^3$ is a group selected from the group consisting of a monovalent hydrocarbon group having 1 to 12 carbon atoms and no aliphatic unsaturated bond, a hydroxyl group, and an alkoxy group, and subscripts c and d are numbers satisfying the following conditions: $1 \leq c+d \leq 3$ and $0.01 \leq c/(c+d) \leq 0.33$.

5. The composition according to claim 1, wherein component (B) is represented by the following average unit formula (3):

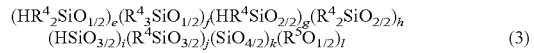

wherein, $R^4$ is a group selected from the group consisting of a monovalent hydrocarbon group having 1 to 12 carbon atoms and no aliphatic unsaturated bond, a hydroxyl group, and an alkoxy group, $R^5$ is a hydrogen atom or an alkyl group having 1 to 6 carbon atoms, and subscripts e, f, g, h, i, j, k, and l are numbers satisfying the following conditions: $e+f+g+h+i+j+k=1$, $0 \leq l \leq 0.1$, $0.01 \leq e+g+i \leq 0.2$, $0.01 \leq e \leq 0.6$, $0.01 \leq g \leq 0.6$, $0 \leq i \leq 0.4$, $0.01 \leq e+f \leq 0.8$, $0.01 \leq g+h \leq 0.8$, and $0 \leq i+j \leq 0.6$.

6. The composition according to claim 1, wherein the component (C) and component (D) each comprise platinum metal in a molar ratio ((C)/(D)), and wherein the molar ratio ((C)/(D)) of the amount of platinum metal in components (C) to (D) is 0.01 to 0.8.

7. The composition according to claim 1, wherein component (C) is one or more transition metal complex catalysts selected from the group consisting of platinum, palladium, rhodium, nickel, iridium, ruthenium, and iron complexes.

8. The composition according to claim 1, adapted for a step curing process including the steps of heating the composition to a temperature at which component (C) exhibits activity but component (D) does not exhibit activity, and then heating at a temperature at which component (D) exhibits activity.

9. A method for forming a cured product, said method comprising:
   (i) heating the composition according to claim 1 at a temperature at which component (C) exhibits activity but component (D) does not exhibit activity and carrying out a first hydrosilylation reaction alone to obtain a semi-cured product; and
   (ii) heating the obtained semi-cured product at a temperature at which component (D) exhibits activity and carrying out a second hydrosilylation reaction to obtain a cured product.

10. A cured product obtained by the method according to claim 9.

11. The cured product according to claim 10, which is a liquid silicon rubber, an adhesive, a thermally conductive elastomer, or a coating agent.

12. A semi-cured product obtained by heating the composition according to claim 1 at a temperature at which component (C) exhibits activity but component (D) does not exhibit activity and carrying out a first hydrosilylation reaction alone.

13. The semi-cured product according to claim 12, wherein the semi-cured product is a thickened body having fluidity at room temperature or a thermoplastic body which is non-fluid at room temperature but exhibits fluidity at 100° C., wherein the viscosity of the thickened body at 25° C. is 1.5 to 100-fold the initial viscosity of the composition, and the viscosity of the thermoplastic body at 100° C. is 1,000,000 mPa·s or less.

* * * * *